United States Patent [19]
Ahern

[11] Patent Number: 5,241,981
[45] Date of Patent: Sep. 7, 1993

[54] SELF-TAPPING PRESSURE RELIEF VALVE

[75] Inventor: Patrick H. Ahern, Monroe, N.C.

[73] Assignee: Conbraco Industries, Inc., Matthews, N.C.

[21] Appl. No.: 880,138

[22] Filed: May 7, 1992

[51] Int. Cl.$^5$ .................. F16K 51/00; F16K 17/04; F16L 55/00

[52] U.S. Cl. .................. 137/318; 137/543.17; 222/5; 222/83.5; 222/91

[58] Field of Search .................. 137/15, 318, 497, 540, 137/543.17, 543.19; 222/5, 83, 83.5, 91; 285/197, 198, 199

[56] References Cited

U.S. PATENT DOCUMENTS

| | | | |
|---|---|---|---|
| 1,022,171 | 4/1912 | Ballard | 137/543.19 |
| 2,130,333 | 9/1938 | Allen | 137/318 |
| 3,554,217 | 1/1971 | Ehrens | 137/318 |
| 3,817,302 | 6/1974 | Kowal et al. | 222/5 |
| 4,776,362 | 10/1988 | Domingue, Sr. et al. | 137/318 |
| 4,921,004 | 5/1990 | Lane et al. | 137/318 |

*Primary Examiner*—George L. Walton
*Attorney, Agent, or Firm*—Shefte, Pinckney & Sawyer

[57] ABSTRACT

A pressure responsive relief valve assembly for relieving an overpressure condition in a piping system includes a valve and a mounting saddle formed as a unit body with a pipe tapping conduit projecting outwardly therefrom for providing communication between the interior of a piping system and the valve, an opposing saddle, and bolts or other fasteners for clamping the saddles to opposite sides of a pipe. Upon tightly clamping the valve assembly to the pipe, the pipe tapping conduit punctures the pipe wall to communicate the valve with the interior of the pipe. A gasket is provided intermediate the valve assembly and the pipe to prevent leakage. The assembly may thus advantageously be installed on a pipe without interrupting fluid flow therethrough.

8 Claims, 2 Drawing Sheets

SELF-TAPPING PRESSURE RELIEF VALVE

BACKGROUND OF THE INVENTION

The present invention relates broadly to pressure responsive relief valves for fluid flow piping systems, and more particularly, to a self-tapping pressure responsive relief valve which can be mounted on a pipe in a fluid flow piping system without interrupting the fluid flowing therethrough.

As with most all substances, fluid, whether water or some other fluid, in a piping system, whether flowing or static, will expand when heated. The material which comprises the piping system will also expand under heat. However, the expansion of the fluid inside the pipe will typically be much greater than the expansion of the pipe itself. Consequently, as the fluid is heated, pressure inside the piping system will increase. There must be a relief valve, a reservoir, or some other means of relieving the overpressure condition or the pipe will swell and likely burst. Unfortunately, there is no way to tell where the break will occur and it will not always occur at the most convenient location to effect repairs.

Relief valves are commonly used to relieve overpressure conditions in steam or other fluid flow piping systems. However, in residential applications, relief valves are used typically on water heaters, yet relief valves are not commonly provided for the piping system itself. As such, to install a relief valve remotely from the water heater in a residential application, flow will have to be interrupted, the pipe cut, a T-joint having a relief valve fitted thereto attached to the piping system at the cut, and the flow restored. This operation is one that is typically beyond the capabilities of the average residential user and requires the services of a professional plumber which can be cost prohibitive.

Accordingly, there exists a need for a pressure responsive relief valve which can be fitted to a residential piping system by one unskilled in plumbing using simple hand tools without interrupting fluid flow through the piping system.

SUMMARY OF THE INVENTION

It is accordingly an object of the present invention to provide a pressure responsive relief valve which is self-tapping for installation on a fluid flow piping system without interrupting fluid flow therethrough.

The pressure responsive relief valve assembly of the present invention is primarily adapted for releasing excess fluid from a fluid flow piping system when overpressurized, the relief valve assembly being characterized by its ability to be mounted to the piping system during operation without interrupting fluid flow therethrough. The relief valve assembly includes a valve having a valve body defining a valve seat, a valve member disposed for movement toward and away from the valve seat, and a spring or other suitable arrangement for normally biasing the valve member into a closed position in sealing engagement with the valve seat and being yieldable in response to a predetermined force of pressurization thereagainst to move into an open position spaced from the valve seat. The relief valve assembly further includes an arrangement for mounting the valve to a pipe in the piping system, the mounting arrangement having at least two mounting portions configured to cooperatively engage the pipe, one mounting portion being formed integrally with the valve body, and fasteners or other means for connecting the mounting portions for clamping the mounting portions rigidly to a pipe in opposition to one another. A pipe tapping conduit is mounted to the valve body in communication with the valve seat for penetrating the pipe upon actuation of the clamping assembly to communicate the valve with the interior of the pipe.

According to the preferred embodiment of the present invention, the valve mounting arrangement includes two opposing saddle members, the first valve mounting portion being a saddle member formed integrally with the valve body and the second mounting portion being a saddle member connectable in opposition to the first valve mounting portion by a pair of spaced apart bolts or other fasteners for receiving a pipe intermediate the saddle members and tightening of the bolts to clamp the relief valve assembly to the pipe.

Preferably, the pipe tapping conduit includes a sharpened end for puncturing the pipe and a sealing arrangement intermediate the sharpened end and the valve body to reduce leakage of the fluid from the pipe at the puncture location of the pipe, such as a rubber gasket surrounding the pipe tapping conduit to be clamped between the pipe and the valve body.

It is further preferred that the valve assembly include an adjustment device for adjusting the biasing force exerted by the biasing arrangement for selectively predetermining the internal pipe pressure at which the valve member will open to relieve pressure within the pipe. Preferably, the biasing arrangement includes a spring and the adjustment assembly includes a cap threadedly mounted to the valve body with the biasing spring being located intermediate the cap and the valve member, thereby allowing adjustment of the spring force applied to the valve member by changing the position of the threaded cap.

DESCRIPTION OF THE PREFERRED EMBODIMENT

Figure 1:
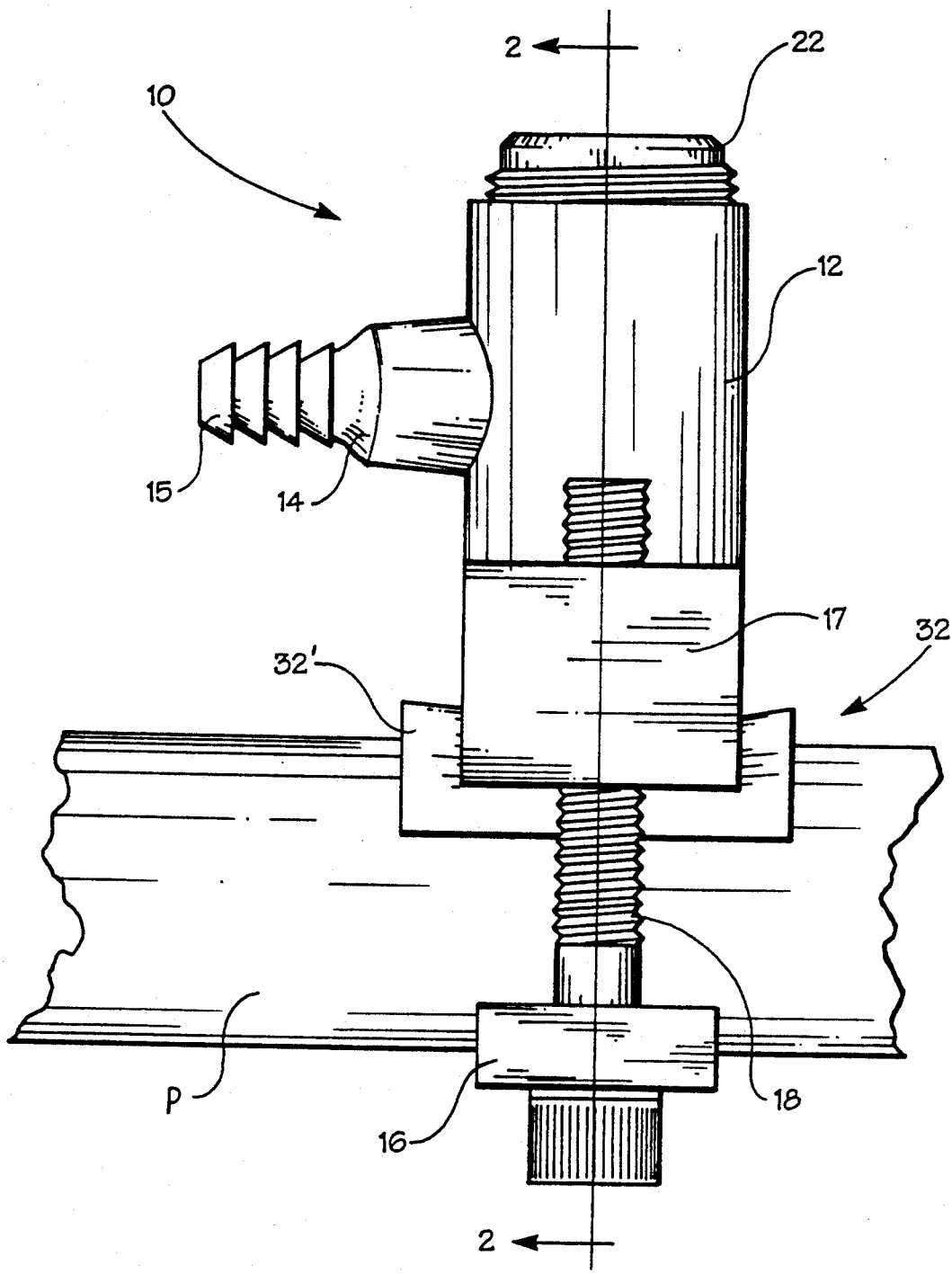
FIG. 1 is a side view of the pressure responsive relief valve assembly of the present invention mounted to a pipe in a piping system.

Referring now to the accompanying drawings and more particularly to FIG. 1, a pressure responsive relief valve assembly according to the preferred embodiment of the present invention is indicated generally at 10 installed on a pipe in a fluid flow system, representatively indicated at P. The relief valve assembly 10 includes a valve 11 with a vent nipple 14 projecting outwardly therefrom, an upper saddle member 17 integrally formed with the valve 12, and a lower saddle member 16 mounted in opposition to the upper saddle member 17 using mounting bolts 18 with the pipe P extending between the upper saddle member 17 and the lower saddle member 16. A gasket 32 is located intermediate the upper saddle member 17 and the pipe P.

Figure 2:
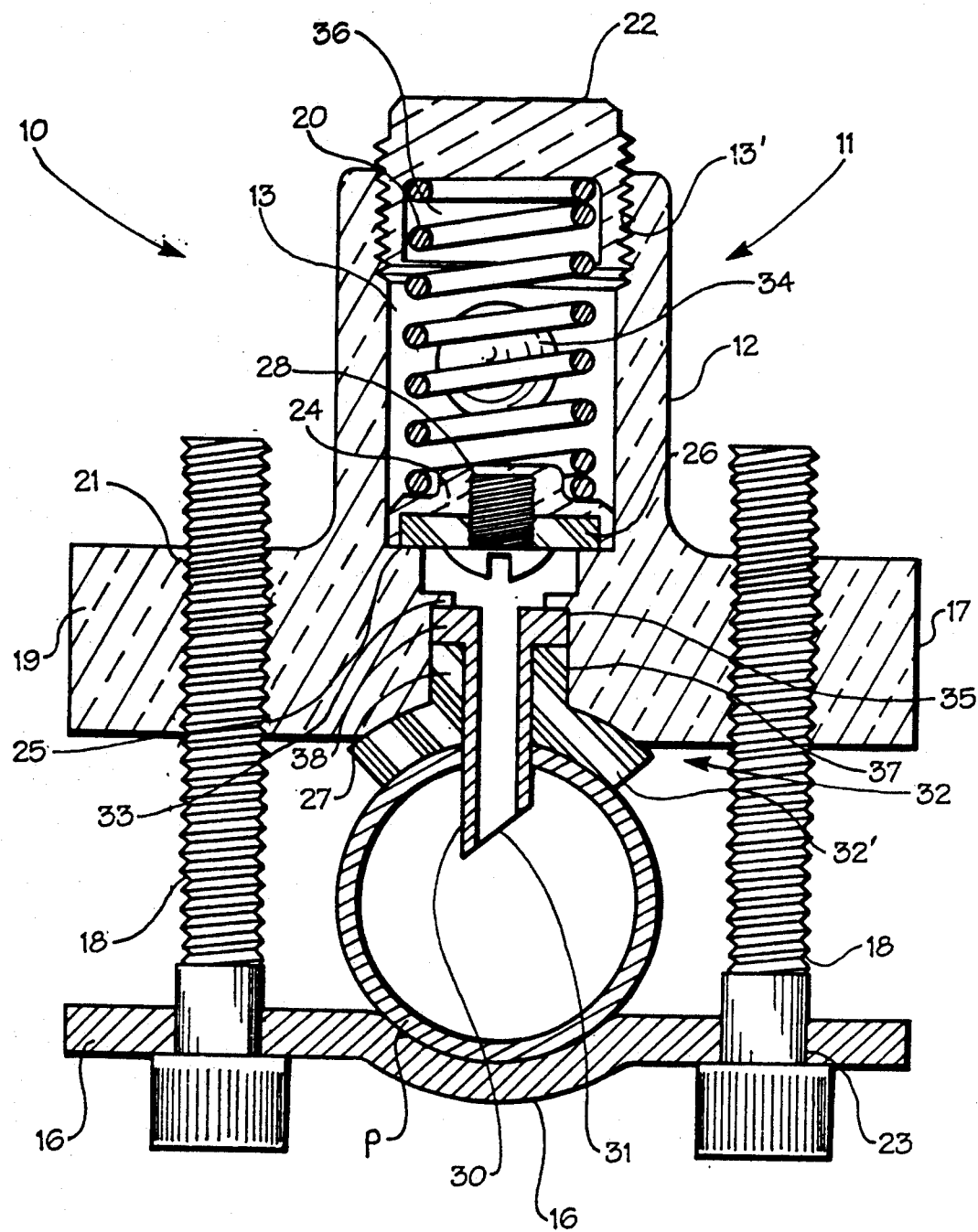
FIG. 2 is a vertical cross-sectional view taken along line 2—2 of FIG. 1 of the pressure responsive relief valve assembly of the present invention.

With reference to FIG. 2, the valve 11 includes a valve body 12 which is formed as a hollow cylinder, open at both ends and integrally formed with the upper saddle member 17 with end portions 19 of the upper saddle member 17 projecting outwardly in opposite directions from the valve body 12 forming a unit body generally in the shape of an inverted "T". Threaded openings 21 are provided and extend through each end portion 19 of the upper saddle member 17. To insure a tight fit with the pipe P, the underside of the upper saddle member 17 has a curvature formed in the central portion thereof generally conforming to the curvature of the pipe P.

A circular vent opening 34 is formed in the side wall of the valve body 12. The vent opening 34 is threaded and configured to accept the vent nipple 14 (see FIG. 1) therein. The vent nipple 14 is a hollow tubular member, threaded on one end for mating receipt in the vent opening 14 and provided on its opposite end with a series of peripheral ridges 15 which will retain a common rubber hose (not shown) applied to the nipple 14 for drainage.

The lower saddle member 16 is a generally planar plate-like member which also has a curvature formed centrally on the upward pipe facing surface thereof, generally conforming to the curvature of the pipe P. Two openings 23 are formed on each end portion thereof for accepting two mounting bolts 18.

A cylindrical opening 13 is formed through the entire length of the valve body 12. Adjacent the location at which the valve body 12 merges with the upper saddle member 17, the diameter of the cylindrical opening 13 decreases to form a circumferential step which defines a valve seat 25. A valve member 24 in the form of a disk is supported on the valve seat 25 and has a threaded bore formed therethrough. A generally washer-like gasket 26 is mounted to the valve member 24 by a screw 28 which passes through the central opening in the valve member gasket 26 and is securely engaged in the threaded opening of the valve member 24 providing the valve member 24 with a sealing surface in contact with the valve seat 25.

The cylindrical opening 13 in the valve body 12 has a threaded portion 13' formed in the upper portion thereof. A generally circular end cap 22 is threadedly mounted in the upper threaded portion 13' of the cylindrical opening 13 in the valve body 12 and has a well 36 formed in the lower face thereof. A valve biasing spring 20 extends in the cylindrical opening 13 formed in the valve body 12 between the well 36 in the end cap 22 and the upper side of the valve member 24 so that, in normal operation, the valve member gasket 26 is forced into abutment with the valve seat 25 to close the interior of valve body 12. The biasing force exerted by the spring 20 may be adjusted by screwing the end cap 22 inwardly or outwardly within its threaded opening 13', as will be explained in greater detail hereinafter.

Closely adjacent and below the valve seat 25, the cylindrical opening 13 is reduced in diameter to provide a thin annular ridge 33 circumferentially about the cylindrical opening 13. Beneath the ridge 33, the diameter of the cylinder opening 13 is increased, with the lower surface of the ridge 33 defining a conduit support seat 35 and the extent of the cylindrical opening 13 below the conduit support seat 35 defining a conduit well 37 which opens to the curved central pipe facing under surface of the upper saddle member 17.

A tubular pipe tapping conduit 30 is fitted in the conduit well 37 to provide communication between the interior 13 of the valve body 12 and the interior of the pipe P. The pipe tapping conduit 30 is an elongate hollow cylinder having a radially projecting collar 38 integrally formed with one end for receipt within the conduit well 37 in abutment with the conduit support seat 35, with the opposite end of the conduit 30 projecting downwardly beyond the underside of the upper saddle member 17 and being angularly cut to provide a sharp needle-like end portion 31 capable of piercing the wall of a pipe P.

A resilient gasket 32 is located intermediate the valve body 12 and the pipe P to prevent fluid leakage around the valve assembly 10 and also to prevent leakage from around the pipe tapping conduit 30 during both installation and operation of the valve assembly 10. The gasket 32 includes a cylindrical portion 27 fitted snugly in the conduit well 37 in abutment with the underside of the collar 38 of the pipe tapping conduit 30 and formed with a central axial opening through which the pipe tapping conduit 30 extends. A flexible sealing collar portion 32' projects radially outwardly from the lower end of the cylindrical portion 27 of the gasket 32 to extend about the curved downward surface of the upper saddle member 17 surrounding the downwardly opening end of the valve opening 13.

Installation and operation of the valve assembly 10 of the present invention is generally as follows. To install the valve assembly 10, the unit of the valve 11, the pipe tapping conduit 30, the gasket 32, and the upper saddle member 17 is placed adjacent a pipe P with the sharpened end 31 of the pipe tapping conduit 30 in contact with the outer surface of the pipe P. The lower saddle member 16 is placed in opposed facing relation to the upper saddle member 17 at the opposite side of the pipe P with the respective openings 21, 23 of the saddle members 16, 17 in general alignment. A connecting bolt 18 is placed through each of the non-threaded holes 23 in the lower saddle member 16 and partially threaded into the corresponding aligned threaded hole 21 in the upper saddle member 17. The mounting bolts 18 are then uniformly tightened to draw the saddle members 16, 17 together into opposed clamping engagement with the pipe P, causing the sharpened end 31 of the pipe tapping conduit 31 to pierce the wall of the pipe P. Since the fluid flow piping system is still under pressure, a certain amount of spray can be expected to result. However, as the bolts 18 are progressively tightened, the pipe tapping conduit 30 is progressively driven through the pipe wall until the sealing collar portion 32' of the gasket 32 seats against the outer wall of the pipe P to seal the puncture location.

In operation, the valve assembly 10 of the present invention will automatically respond to any overpressure condition within the piping system. Should the fluid within the piping system expand significantly, e.g. due to being heated, the pressure within the piping system will increase and this increase will be exerted through the pipe tapping conduit 30 on the lower surface of the valve member 24. If the pressure on the valve member 24 from the fluid is greater than the force exerted by the biasing spring 20, the fluid pressure will cause the valve member 24 to lift from the valve seat 25 providing a flow path for fluid from the piping system through the pipe tapping conduit 30 around the open valve member 24 and out through the nipple 14 to the drain. Once the overpressure condition has been relieved, the pressure on the valve member 24 exerted by the fluid in the piping system will no longer be greater than the biasing force exerted by the biasing spring 20 and the valve member 24 will be returned against its seat 25 by the biasing spring 20, thus closing the valve.

A conventional rubber hose (not shown) may be fitted to the vent nipple 14 to serve as a drain tube. Once the hose (not shown) is installed on the nipple 14 it may be routed to a drain (not shown).

To adjust the valve assembly 10 to respond at different levels of pressurization within a fluid flow piping system, the end cap 22 is screwed in and out of the threaded portion of the cylindrical opening 13' thus increasing and decreasing the confinement of the biasing spring 20 and thereby increasing and decreasing the force of the biasing spring 20 on the valve member 24.

By the present invention, a pressure sensitive relief valve formed integrally with a mounting arrangement provides easy installation in a piping system without interrupting fluid flow therethrough. The valve assembly 10 of the present invention is of a simplified unitary construction which may easily be installed by an average homeowner seeking an inexpensive method to provide overpressurization relief for household piping systems.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

I claim:

1. A pressure responsive relief valve assembly for releasing excess fluid from a fluid flow piping system when overpressurized, said relief valve assembly being characterized by its ability to be mounted to said piping system during operation without interrupting fluid flow therethrough, said valve assembly comprising:

a valve having a valve body defining a valve seat, a valve member disposed for movement toward and away from said valve seat, and means for normally biasing said valve member into a closed position in sealing engagement with said valve seat and being yieldable in response to a predetermined force of pressurization thereagainst to move into an open position spaced from said valve seat;

means for mounting said valve to a pipe in said piping system, said mounting means having at least two mounting portions configured to cooperatively engage said pipe, one said mounting portion being formed integrally with said valve body, and means for connecting said mounting portions for clamping thereof rigidly to said pipe in opposition to one another; and a pipe tapping conduit rigidly mounted to said valve body in fixed relation thereto and in communication with said valve seat for penetrating said pipe upon and as a necessary result of actuation of said clamping means to communicate said valve with the interior of said pipe.

2. A pressure responsive relief valve assembly according to claim 1 wherein said valve mounting means includes two opposing saddle members, said first valve mounting portion being a saddle member formed integrally with said valve body and said second mounting portion being a saddle member connectable in opposition to said first valve mounting portion by a pair of spaced-apart fasteners for receiving a pipe intermediate said saddle members and tightening of said fasteners to clamp said relief valve assembly to said pipe.

3. A pressure responsive relief valve assembly according to claim 2 wherein said pipe tapping conduit includes a sharpened end for puncturing said pipe and sealing means intermediate said sharpened end and said valve body to reduce leakage of the fluid from said pipe at the puncture location of said pipe.

4. A pressure responsive relief valve according to claim 3 wherein said sealing means in a rubber gasket surrounding said pipe tapping conduit to be clamped between said pipe and said valve body.

5. A pressure responsive relief valve assembly according to claim 1 wherein said pipe tapping conduit includes a sharpened end for puncturing said pipe and sealing means intermediate said sharpened end and said valve body to reduce leakage of the fluid from said pipe at the puncture location of said pipe.

6. A pressure responsive relief valve according to claim 5 wherein said sealing means is a resilient gasket surrounding said pipe tapping conduit to be clamped between said pipe and said valve body.

7. A pressure responsive relief valve assembly according to claim 1 wherein said valve includes adjustment means for adjusting the biasing force exerted by said biasing means for selectively predetermining the internal pipe pressure at which said valve member will open to relieve pressure within said pipe.

8. A pressure responsive valve assembly according to claim 7 wherein said biasing means includes a spring and said adjustment means includes a cap threadedly mounted to said valve body with said biasing spring being located intermediate said cap and said valve member thereby allowing adjustment of the spring force applied to said valve member by changing the position of said threaded cap.

* * * * *

UNITED STATES PATENT AND TRADEMARK OFFICE
CERTIFICATE OF CORRECTION

PATENT NO. : 5,241,981
DATED : September 7, 1993
INVENTOR(S) : Patrick H. Ahearn It is certified that error appears in the above-indentified patent and that said Letters Patent is hereby corrected as shown below:

Title page, item [75], inventor: Delete "Ahern" and insert therefor-- Ahearn --.

Signed and Sealed this

Nineteenth Day of July, 1994

Attest:

BRUCE LEHMAN

Attesting Officer     Commissioner of Patents and Trademarks